United States Patent [19]
Morris

[11] Patent Number: 6,062,132
[45] Date of Patent: May 16, 2000

[54] COOKING APPARATUS

[76] Inventor: Jonathan Emrys Morris, 30 Centre Drive, Newmarket, Suffolk CB8-8AN, United Kingdom

[21] Appl. No.: 09/171,452
[22] PCT Filed: Apr. 15, 1997
[86] PCT No.: PCT/GB97/01039
§ 371 Date: Dec. 17, 1998
§ 102(e) Date: Dec. 17, 1998
[87] PCT Pub. No.: WO97/39670
PCT Pub. Date: Oct. 30, 1997

[30] Foreign Application Priority Data

Apr. 19, 1996 [GB] United Kingdom .................. 9608096

[51] Int. Cl.[7] ...................................................... A47J 37/12
[52] U.S. Cl. .............................. 99/404; 99/407; 99/408; 99/409; 99/416
[58] Field of Search ...................... 99/330, 336, 403–418, 99/427, 443 R, 443 C, 448, 352–355; 426/438, 523, 520, 302; 126/391, 21 A; 210/167, DIG. 8

[56] References Cited

U.S. PATENT DOCUMENTS

| | | |
|---|---|---|
| 1,814,784 | 7/1931 | Bennett . |
| 2,616,359 | 11/1952 | Pierson . |
| 3,078,786 | 2/1963 | Arvan . |
| 3,643,588 | 2/1972 | Schwarz et al. . |
| 4,031,820 | 6/1977 | Reed . |
| 4,153,736 | 5/1979 | Lents . |
| 4,287,818 | 9/1981 | Moore et al. .............................. 99/355 |

FOREIGN PATENT DOCUMENTS

| | | |
|---|---|---|
| 2439574 | 5/1980 | France . |
| 97/03596 | 2/1997 | WIPO . |

*Primary Examiner*—Timothy Simone
*Attorney, Agent, or Firm*—Ostrolenk, Faber, Gerb & Soffen, LLP

[57] ABSTRACT

Apparatus for cooking food comprises a vessel (12) for hot liquid in which the food is to be cooked, and a basket (18) for holding an item of food to be cooked by being immersed in the liquid. The food can be introduced into and removed from the basket (18) from an opening (for example, in the top) of the latter. The basket is supported on support means, such as a wheel (16), and there is provided a retaining member such as a lid (100) for extending across the opening in the basket to retain food therein during cooking. The lid (100) is preferably mounted on the wheel (16) such that the removal of the basket (18) from the wheel (16) separates the basket (18) from the lid (100) to allow access to the interior of the basket(18).

16 Claims, 8 Drawing Sheets

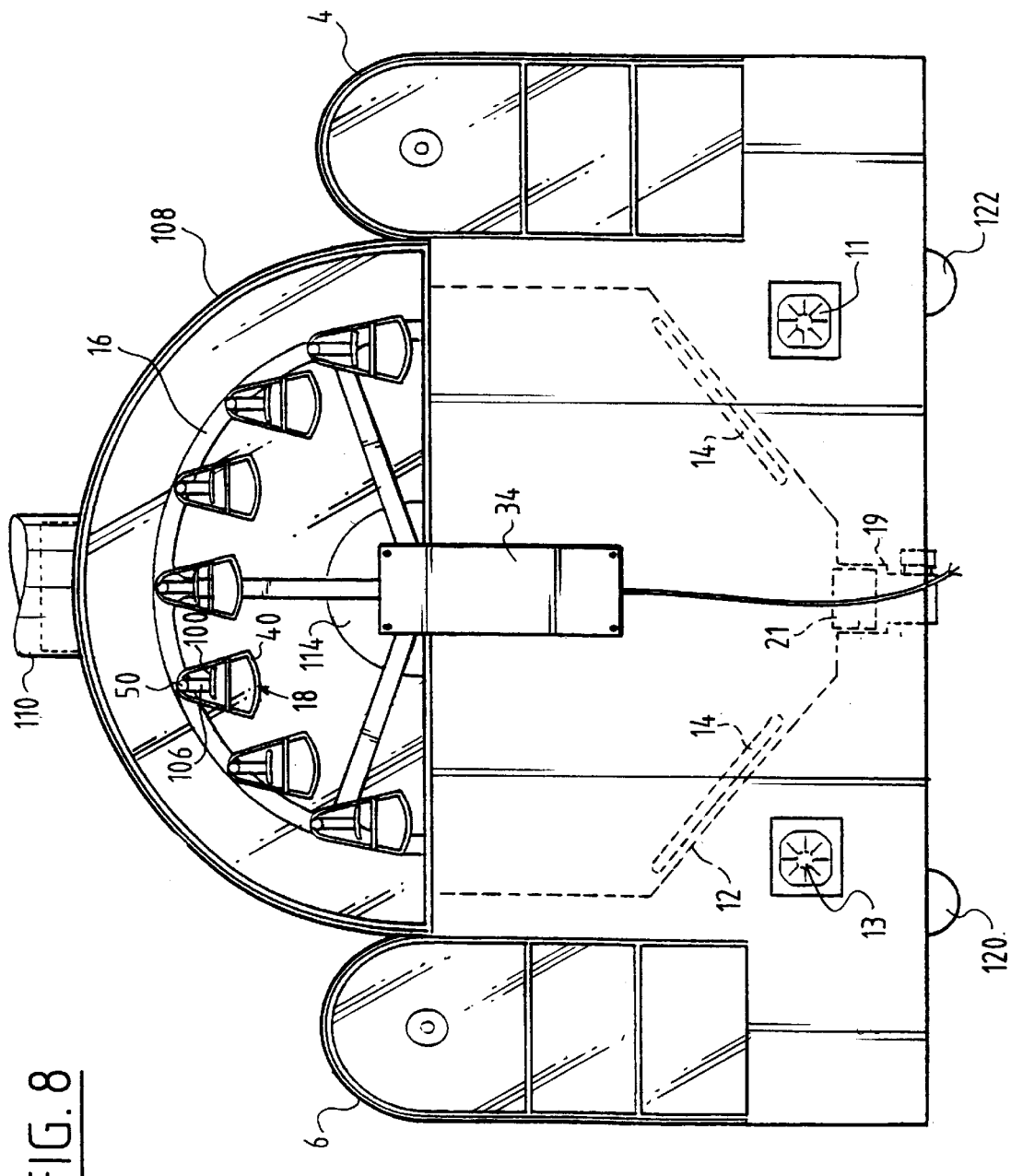

COOKING APPARATUS

FIELD OF THE INVENTION

This invention relates to cooking apparatus, and is particularly applicable to frying apparatus, the apparatus as shown in the present Applicant's co-pending UK Patent Application No. 9515167.6.

BACKGROUND TO THE INVENTION

Known types of frying apparatus include a vessel for containing hot oil or fat, and a basket for holding the items of food to be fried. The basket can be lowered part way into the vessel so as to immerse the items of food in the liquid, and includes a handle which enables it to be removed once the food has been cooked.

Ideally, each item of food needs to be completely immersed in the frying liquid in order to ensure that it is evenly cooked. However, certain larger items of food can float to the surface of the frying liquid, and effect which is enhanced by the expansion of any air in the food, and as a result those items may not be evenly cooked.

The problem is not solved by the total immersion of the basket in the frying liquid, since then the food can simply float out of the basket.

SUMMARY OF THE INVENTION

According to the invention, there is provided apparatus for cooking food, the apparatus comprising a vessel for containing hot liquid in which the food is to be cooked, a basket for holding an item of food to be cooked, support means for supporting the basket in a position in which it is immersed in the liquid, and a retaining member for retaining food in the basket during cooking, the retaining member and basket being moveable relative to each other, between a closed position, in which the retaining member extends across at least part of the top of the basket to retain food therein, and an open position in which the retaining member is positioned sufficiently clear of the basket to allow food to be placed therein or removed therefrom.

Thus, even if an item of food being cooked in the basket is less dense than the cooking liquid, it will be prevented from floating out of the basket by the retaining member. Accordingly, the retaining member allows the basket to be immersed totally in the cooking liquid so as to ensure that the food in the basket is evenly cooked.

Preferably, the retaining member is mounted on the support means and the basket is removably mounted on the support means so that the retaining member and basket are in said closed position when the basket is mounted on the support means and in said open position when the basket is removed from the support means.

This avoids the need for any relatively complex opening or closing mechanism for the retaining member, since the user will automatically have access to the contents of the basket on removal from the support means, since the retaining member remains on the support means after the basket has been removed.

Preferably, the retaining member comprises a lid.

The support means may to advantage be moveable relative to the vessel to lower the basket into or raise the basket from the vessel, and in such a case the support means is preferably connected to drive means for moving the support means, and thereby automatically raising or lowering the basket.

Preferably, the support means comprises a rotary member, and the drive means comprises a motor for rotating the rotary member about an axis spaced from the basket and lid, so that said rotation in a given sense lowers the basket and lid into and then raises the basket and lid from the vessel.

In such a case, the basket and lid are preferably rotatable relative to the rotary member so that their attitude remains substantially unchanged as the rotary member rotates.

To that end, the basket, when mounted on the support member, may to advantage be so connected to the lid that both basket and lid are rotationally located relative to each other so as to prevent relative rotation of the basket and lid in use.

This ensures that, during cooking, the lid does not rotate clear of the basket as a result of, for example, eddy currents in the cooking liquid.

Preferably, the rotary member is attached to a rod which is substantially parallel to the axis of rotation of the rotary member, and on which the lid is mounted for rotation about the rod axis, the basket being adapted to be suspended from the rod. Conveniently, the basket is attached to hoops for fitting over the rod to suspend the basket therefrom, said hoops also being so positioned as to engage the lid, with the basket so suspended, to provide said rotational location of the basket and the lid.

Preferably, the rod is one of a plurality of such rods attached to the rotary member at angularly spaced positions relative to the axis of rotation of the latter, each rod, in use, supporting a respective basket and lid, the arrangement being such that, in use, rotation of the rotary member successively immerses the baskets in the cooking liquid and then removes the baskets therefrom.

It will be appreciated that the lids are of particular advantage to this arrangement, since each basket is automatically completely immersed in the cooking liquid. Furthermore, the mounting of the lids on the rods enables a user to fill or empty a basket rapidly, which is particularly important if a large number of baskets have to be dealt with in a very short time. The invention is thus of particular advantage to the type of frying apparatus shown in UK Patent Application No. 9515167.6 and published PCT Specification No. WO97/03596, and enables that apparatus to be used with food which would otherwise float out of the baskets during cooking.

The rotary member may conveniently comprise a wheel.

Preferably, the device includes a heater for heating the liquid in the vessel, and the heater may to advantage be positioned above the bottom of the vessel so that liquid in the bottom of the vessel is cooler than liquid elsewhere in the vessel.

This feature prevents or reduces the tendency of any scraps of food, such as crumbs, which have accumulated at the bottom of the vessel, to burn.

Preferably, the bottom of the vessel includes a removable filter, which may to advantage be situated in a recess in the bottom of the vessel, for collecting said scraps. Conveniently, the vessel includes a drainage port for allowing drainage of the liquid from the vessel, the port being situated downstream of said filter.

BRIEF DESCRIPTION OF THE DRAWINGS

Apparatus in accordance with the invention will now be described, by way of example only, with reference to the accompanying drawings which show cooking apparatus having a wheel and a number of baskets removably mountable thereon, and in which:

FIG. 8 is a rear view of the apparatus.

DETAILED DESCRIPTION

Figure 1:
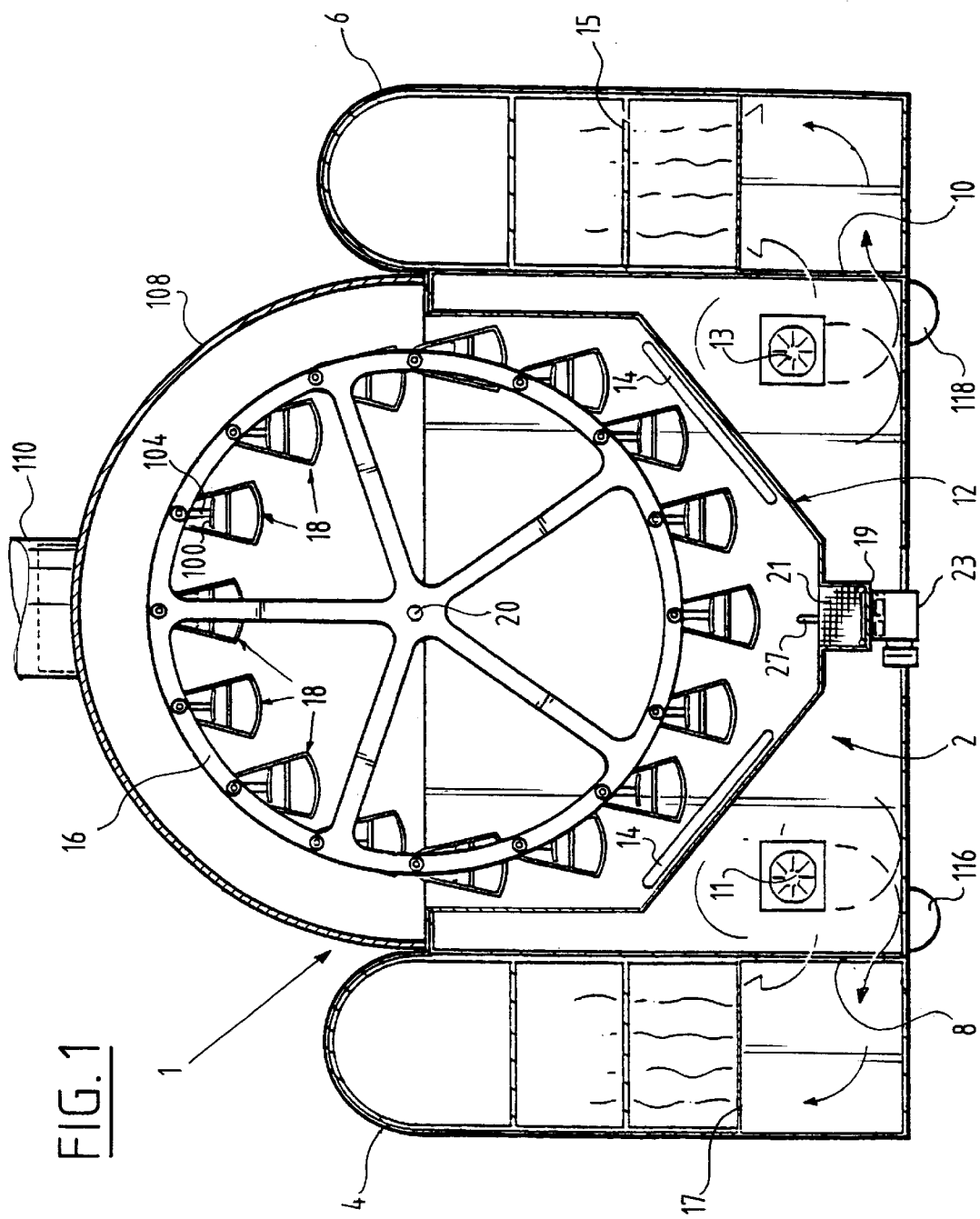
FIG. 1 is a partially cut-away front view of the apparatus showing the wheel with a maximum number of baskets thereon.
Figure 7:
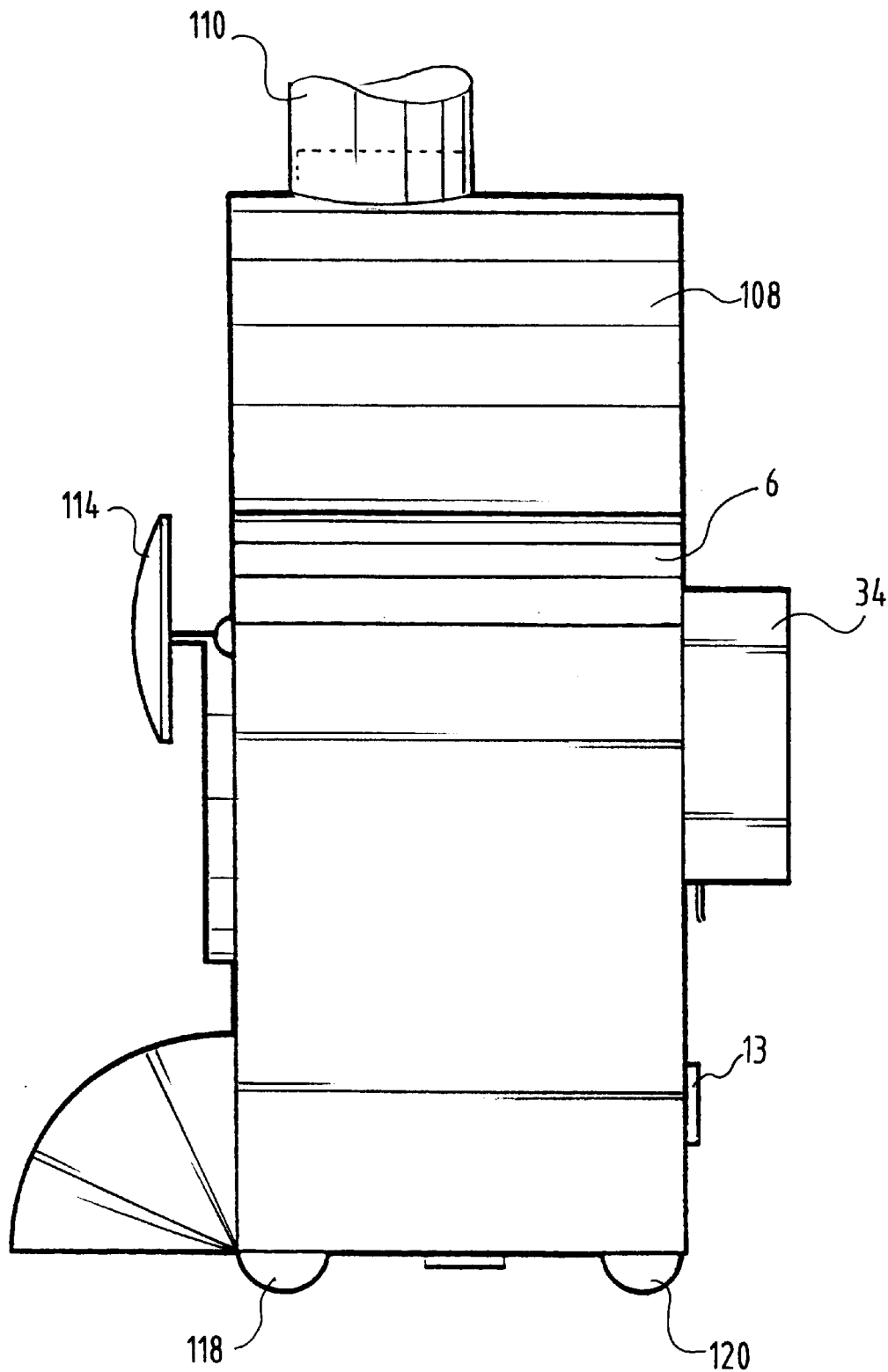
FIG. 7 show apparatus from one side.

With reference to FIG. 1, the apparatus comprises a centre housing 1 having a central chamber 2 and flanked by two glass fronted, arched side housings 4 and 6. The interiors of the housings 4 and 6 communicate with the central chamber 2 through apertures 8 and 10 in the housing 1. The housing has four feet 116, 118, 120, 122 (FIGS. 7 and 8) arranged at the corners of a notional rectangle on which the apparatus stands.

The housings 4 and 6 are attached to the housing 1 by clips (not shown) which are releasable to allow the housings 4 and 6 to be removed from the housing 1.

The central chamber 2 contains a pair of fans 11 and 13 which direct air form the central chamber 2 through the apertures 8 and 10 and into the housings 4 and 6 where the air rises through a series of three perforated plates, two of which are referenced 15 and 17 in each side chamber.

The central chamber 2 also contains a vessel 12 which is partially tapered and which, in use, contains oil or fat in which the food is to be fried. The oil or fat is heated by a pair of electric heating elements 14 in the region of the bottom of the container 12.

A box-shaped recess 19 is provided at the bottom of the vessel 12, and accommodates a filter tray 21. The bottom of the recess 19 incorporates an outlet port, beneath the tray 21, through which oil or fat can be drained (via the filter tray 21) by means of an outlet valve 23. The tray 21 catches crumbs/debris released into the oil or fat during cooking, and is attached to a wire 25 which is bent into a loop so as to provide an eyelet 27. The eyelet enables the tray 21 to be lifted out of the vessel 12 (by means of, for example, a hook) for cleaning.

The container 12 also partially accommodates a wheel 16 on which sixteen baskets, for example 18, are suspended at regular angular intervals. As can be seen from FIG. 2, the wheel 16 is attached to one end region of a horizontal shaft 20 which is situated above the vessel 12. The opposite end of the shaft 20 is connected to a motor 24 via a reduction gearbox 26, having an output shaft 30 attached to the shaft 20. The motor 24 is contained within a housing 34 which projects rearwardly from the housing 1 teg as shown in FIG. 3). The motor 24 is operable to rotate the wheel 16.

Figure 2:
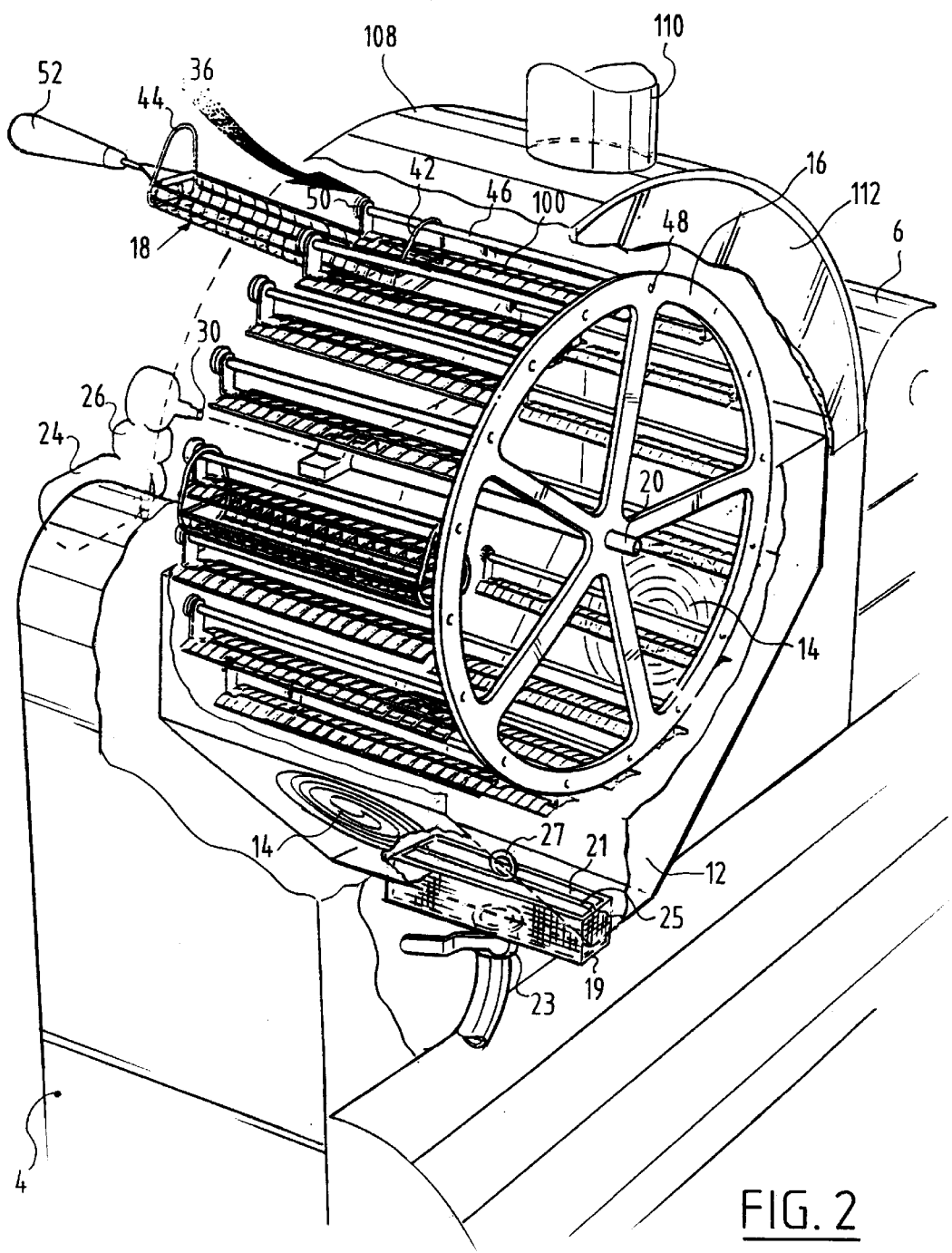
FIG. 2 is a partially cut-away partially exploded perspective view of the apparatus with some of the baskets removed.
Figure 3:
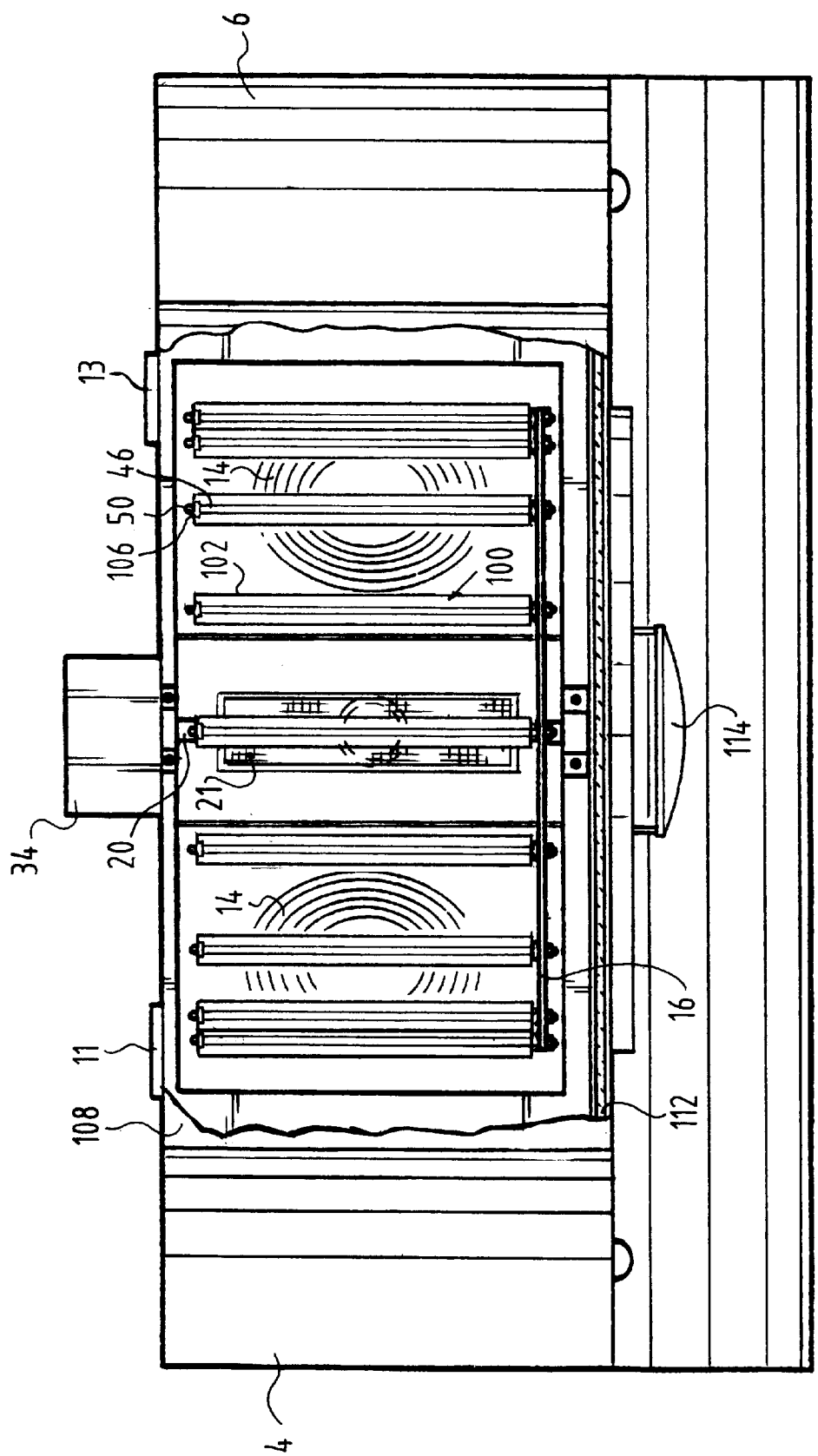
FIG. 3 is a cut away plan view of the apparatus, showing the wheel with no baskets thereon.

The portion of the housing 1 immediately above the vessel 12 is open at the rear to enable an operator to have access to the baskets on the wheel 18 in the direction indicated by the arrow 36 in FIG. 2.

Figure 4:
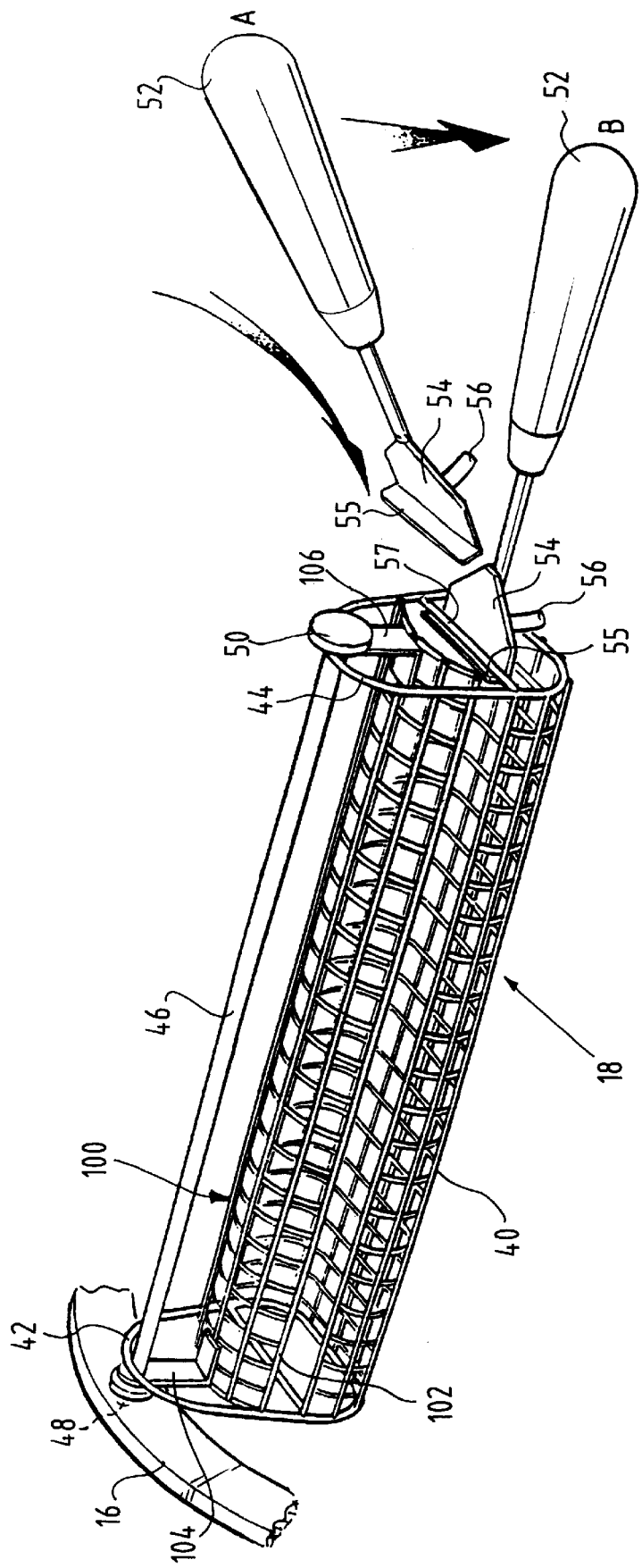
FIG. 4 shows a single basket.
Figure 5:
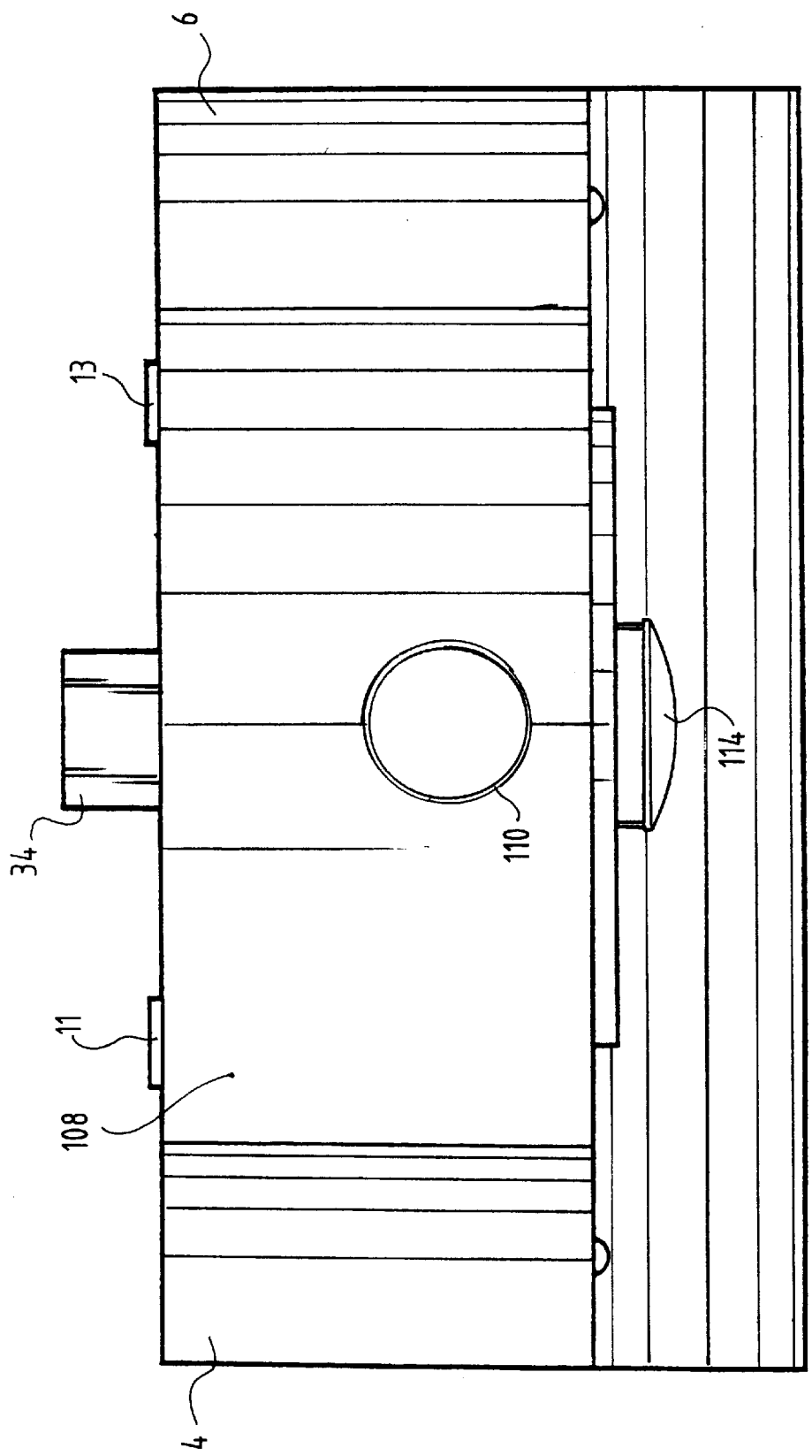
FIG. 5 is a plan view of the apparatus.
Figure 6:
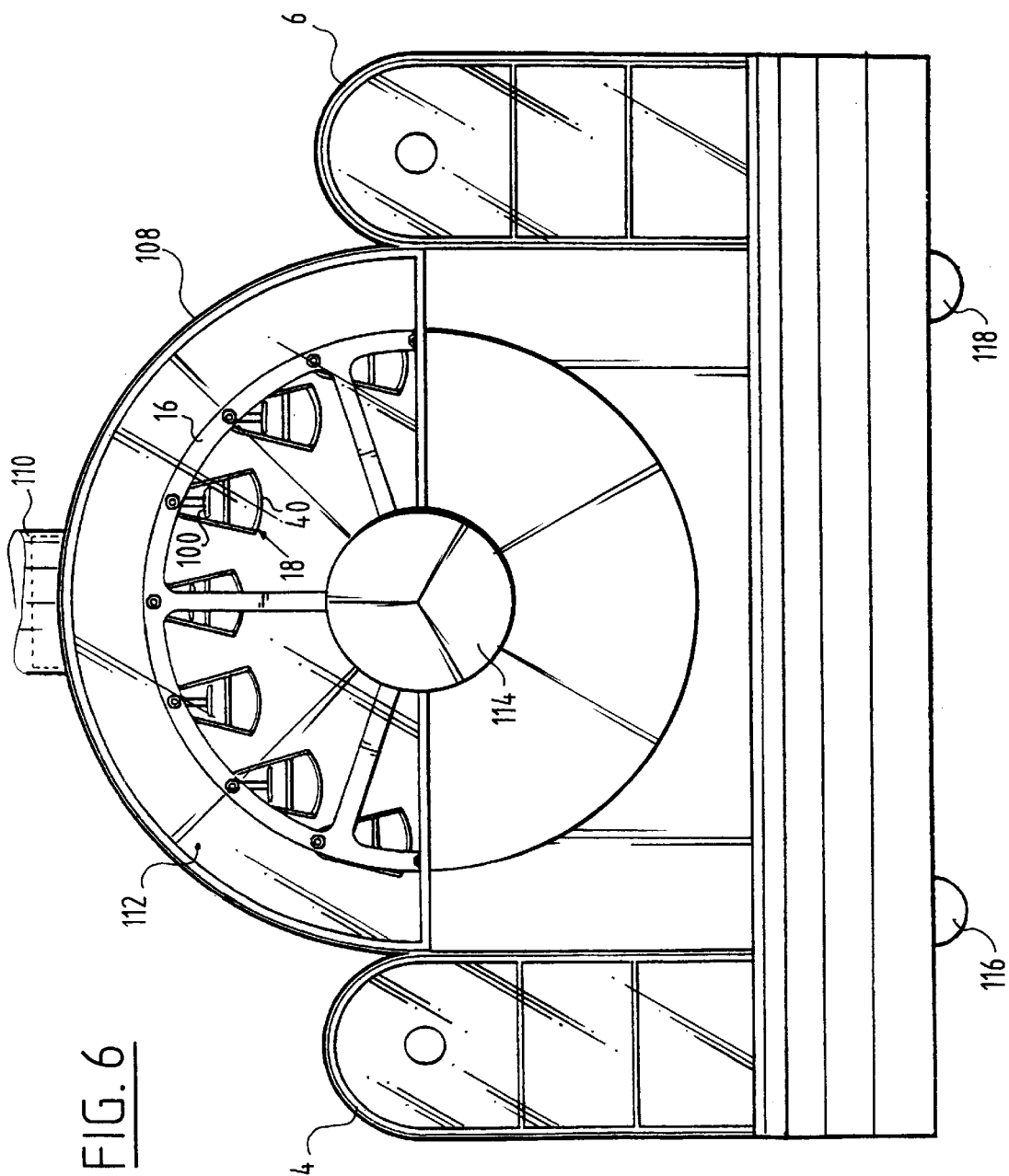
FIG. 6 is a front view of the apparatus.

Since all the baskets are identical (and are connected to the wheel 16 in the same way), only the basket and connection arrangement shown in FIG. 2 will be described in detail. With reference to FIGS. 2 and 4, each basket comprises an elongated platform 40 which is formed integrally with a pair of vertical wire and hoops 42 and 44. The wheel 16 includes a number of rods, for example the rod 46, each of which is attached by means of an end nut, for example 48, and which extends axially from the rear of the wheel 16. Each rod, in use, extends through the shaped end hoops of a respective basket so that the basket is suspended from the rod and is rotatable relative to the rod. The outboard end of each rod includes a head, for example 50, which retains the basket on the rod. It will be appreciated that the basket can be readily removed by being raised and then moved axially until the end hoops 42 and 44 are clear of the rod 46, and can be readily placed on the rod 46 by the reverse action.

The operator can manipulate each basket by means of a detachable handle 52 which includes a forward platform 54 from which a ridge 55 projects upwardly a vertical leg 56 which projects downwardly from the plate 54. In FIG. 4 the handle is shown in two positions, one prior (position A) to attachment to the basket, the other (position B) when the handle 52 is attached to the basket.

When the handle 53 is to be attached to a basket, it is moved towards the basket in the orientation shown in position A so that the ridge 55 passes under and then seats against a cross-piece 57 at the end of the basket. The handle 52 is then pivoted downwardly until the leg 56 engages the bottom of the basket, i.e. until position B is reached. In this position, the cross-piece 57 rests in the corner formed by the platform 54 and ridges 55, and the moment of the basket about that part of the handle is countered by the engagement of the leg 56 with the basket. The handle can be released from the basket by upwardly tilting the handle relative to the basket to allow the ridge 55 to pass back underneath the cross-piece 57.

Thus, an operator can use the same handle to manipulate all the baskets on the wheel without having to touch any part of the baskets themselves which (if the baskets have just been immersed in the oil) will be very hot.

Each rod on the wheel 16 is attached to a respective lid. Since all the lids are identical, only the lid attached to the rod 46 will be described in detail. The lid shown in FIG. 4 is denoted by the reference number 100, and comprises an arched strip 102 of wire arranged in a grid pattern. The strip 102 is one of the same construction as the platform 40, and is attached at opposite ends to tow L-shaped connectors 104 and 106. The vertical portions of the connectors 104 and 106 constitute fixing lugs which include circular apertures through which the rod 46 extends, with a small amount of clearance. As a result of that clearance, the rod 46 can rotate, relative to the lid 100, about its own axis while the attitude of the lid 100 remains substantially unchanged, the weight of the lid tending to keep it in the attitude shown in FIG. 4.

The ends of the strip 102 extend through and engage the wire hoops 42 and 44 of the basket which is also mounted on the rod. The engagement of the strip 102 with the hoops 42 and 44 rotationally secures the lid 100 to the basket, thus ensuring that the lid 100 remains in registry with the basket.

As can be seen from FIG. 2, when the basket is removed, the lid remains with the rod 46. Thus, the removal of the basket from the wheel also separates the basket from its lid to allow access to the interior of the basket.

In use, an operator will load each of a suitable number of baskets with a required number of items of food to be cooked, and will place each of those baskets on a respective rod which projects from the wheel 16 and is not immersed in the fat or oil. The motor 24 normally operates continuously, as a result of which the baskets loaded with food- are immersed in succession in the oil or fat, travel through the oil or fat and are substantially raised therefrom. As the baskets travel through the oil or fat, their lids prevent the items of food floating out of the baskets. The speed of rotation of the wheel 16 is such that the baskets are each immersed in the oil or fat for a suitable time for cooking the food. The motor 24 is, however, connected to control means (not shown) which enable and operator to vary the operating speed of the motor or even stop or reverse the motor if desired.

Once extracted from the oil or fat, the baskets can be left on the wheel 16 for a sufficient period for the cooked food to drain, before the baskets are removed and the food thereon transferred to the cabinets 4 and 6 or immediately served.

If orders for more food are received after the originally loaded baskets have been mounted on the wheel 16, the operator simply has to place further loaded baskets on additional other rods on the wheel as and when the latter becomes available. Consequently, the frying of the additional items of food can begin before all the original items have been fried.

The fans 11 and 13 direct air which has been heated through contact with the exterior of the vessel 12 through the cabinets 4 and 6 to keep the food therein hot.

The wheel is situated beneath a hood 108 which is slidable, in either direction parallel to the wheel axis, to allow access to the wheel 16 for maintenance and cleaning of the apparatus, and which is connected to a chimney 110 for venting the apparatus. A semi-circular glass panel 112 forms part of the housing 1 beneath the hood 108, and enables potential customers to see food in the baskets which are currently not immersed in the vessel 112. The rest of the housing 1 is of stainless steel, including a front hub cover 114 which covers the front end of the shaft 20. The hub 114 acts as a lamp shade for a light (not shown) situated behind the hub. The light is operable to illuminate the wheel and baskets through the glass panel 112.

What is claimed is:

1. Apparatus for cooking food, the apparatus comprising a vessel for containing hot liquid in which the food is to be cooked, a basket for holding an item of food to be cooked, the basket having an opening through which an item of food can be placed in or removed from the basket, support means for supporting the basket in a position in which it is immersed in the liquid, and a retaining member for retaining food in the basket during cooking, the retaining member and basket being moveable relative to each other, between a closed condition, in which the retaining member extends across at least part of the opening in the basket to retain food therein, and an open condition in which the retaining member is positioned sufficiently clear of the basket to allow food to be placed therein or removed therefrom.

2. Apparatus according to claim 1, in which the retaining member is mounted on the support means and the basket is removably mounted on the support means so that the retaining member and basket are in said closed condition when the basket is mounted on the support means and in said open conditions when the basket is removed from the support means.

3. Apparatus according to claim 1, in which the retaining member comprises a lid.

4. Apparatus according to claim 1, in which the support means is moveable relative to the vessel to lower the basket into or raise the basket from the vessel.

5. Apparatus according to claim 4, in which the support means is connected to drive means for so moving the support means as to raise or lower the basket.

6. Apparatus according to claim 5, in which the support means comprises a rotary member, and the drive means comprises a motor for rotating the rotary member about an axis spaced from the basket and retaining member, so that said rotation in a given sense both lowers the basket and retaining member from the vessel.

7. Apparatus according to claim 6, in which the basket and retaining member are rotatable relative to the rotary member so that their attitude remains substantially unchanged as the rotary member rotates.

8. Apparatus according to claim 6, in which the basket, when mounted on the support member, is so connected to the retaining member that both basket and retaining member are rotationally located relative to each other so as to prevent relative rotation of the basket and retaining member in use.

9. Apparatus according to claim 8, in which the retaining member is rotatably mounted on a protuberance which extends from the rotary member, the basket being adapted to be suspended from the protuberance.

10. Apparatus according to claim 9, in which the protuberance comprises a rod which is substantially parallel to the axis of rotating of the rotary member, the retaining member being rotatable about the rod axis.

11. Apparatus according to claim 9, in which the basket is attached to hoops for fitting over the protuberance to suspend the basket therefrom, said hoops also being so positioned as to engage the retaining member, with the basket so suspended, to provide rotational location of the basket and the retaining member relative to each other.

12. Apparatus according to claim 1, in which the rod is one of a plurality of such rods attached to the rotary member at angularly spaced positions relative to the axis of rotation of the latter, each rod, in use, supporting a respective basket and retaining member, the arrangement being such that, in use, rotation of the rotary member successively immerses the baskets in the cooking liquid and then removes the baskets therefrom.

13. Apparatus according to claim 12, in which the rotary member comprises a wheel.

14. Apparatus according to claim 1, in which the apparatus includes a heater for heating the liquid in the vessel, the heater being pivoted in a position spaced from a zone at the bottom of the vessel for collecting scraps of food released from the basket during the cooking process.

15. Apparatus according to claim 14, in which said zone comprises a recess in the bottom of the vessel, and the vessel includes a removable filter, situated in the recess.

16. Apparatus according to claim 15, in which the vessel includes a drainage port for allowing drainage of the liquid from the vessel, the port being situated downstream of said filter.

* * * * *